United States Patent
Cornelis et al.

(10) Patent No.: US 10,900,864 B2
(45) Date of Patent: Jan. 26, 2021

(54) METHOD AND SYSTEM FOR ACCELERATED FATIGUE DAMAGE TESTING OF AN OBJECT

(71) Applicant: SIEMENS INDUSTRY SOFTWARE NV, Leuven (BE)

(72) Inventors: Bram Cornelis, Leuven (BE); Bart Peeters, Wilsele (BE)

(73) Assignee: SIEMENS INDUSTRY SOFTWARE NV, Leuven (BE)

( * ) Notice: Subject to any disclaimer, the term of this patent is extended or adjusted under 35 U.S.C. 154(b) by 242 days.

(21) Appl. No.: 16/097,456

(22) PCT Filed: Apr. 29, 2016

(86) PCT No.: PCT/EP2016/059649
§ 371 (c)(1),
(2) Date: Oct. 29, 2018

(87) PCT Pub. No.: WO2017/186306
PCT Pub. Date: Nov. 2, 2017

(65) Prior Publication Data
US 2019/0145855 A1    May 16, 2019

(51) Int. Cl.
*G01M 7/02* (2006.01)
*G01M 5/00* (2006.01)

(52) U.S. Cl.
CPC .......... *G01M 7/022* (2013.01); *G01M 5/0066* (2013.01); *G01M 7/02* (2013.01); *G01M 7/025* (2013.01)

(58) Field of Classification Search
CPC ............ G01M 7/00–08; G01M 5/0066; G01N 2203/073

(Continued)

(56) References Cited

U.S. PATENT DOCUMENTS 5,565,618 A * 10/1996 Hu .......................... G01M 7/022
73/1.82
2002/0118652 A1  8/2002 Ahmed et al.
(Continued)

FOREIGN PATENT DOCUMENTS

CN    102798508    11/2012
EP    1213848    6/2002
(Continued)

OTHER PUBLICATIONS

Halfpenny et al, Environmental Accelerated Testing. Use of Virtual Test to Extend Physical Approach, nCdoe White Paper Astelab 2008 (Year: 2008).*

(Continued)

*Primary Examiner* — David L Singer
(74) *Attorney, Agent, or Firm* — Cozen O'Connor

(57) ABSTRACT

A method and system for accelerated fatigue damage testing of an object excited via an actor, wherein a drive signal is generated and transmitted to the actor, where the acceleration of the object or a mounting base of the actor is measured and supplied to a control system, where a Power Spectral Density (PSD) and a Fatigue Damage Spectrum FDS within the control system are calculated from the measured acceleration, whereby the calculated PSD is compared with a target PSD, whereby the calculated Fatigue Damage Spectrum FDS is compared with a target FDS, whereby a new drive frequency spectrum is calculated based on the comparisons and, one or multiple time domain blocks for the drive signal for a next cycle are generated from the new drive frequency spectrum and transmitted to the actor such that accelerated vibration testing without affecting the failure mode is achieved which provides realistic results.

15 Claims, 2 Drawing Sheets

(58) Field of Classification Search
USPC .......................................... 73/577, 662–672
See application file for complete search history.

(56) References Cited

U.S. PATENT DOCUMENTS

| | | | |
|---|---|---|---|
| 2003/0114995 A1* | 6/2003 | Su | G06F 30/23 702/34 |
| 2007/0185620 A1* | 8/2007 | Van Baren | G01M 7/022 700/280 |
| 2010/0305886 A1* | 12/2010 | Zhuge | G05B 19/19 702/56 |
| 2013/0231878 A1* | 9/2013 | Snyder | G01M 7/022 702/56 |
| 2014/0129030 A1* | 5/2014 | Zhuge | G05D 19/02 700/275 |

FOREIGN PATENT DOCUMENTS

| | | | | |
|---|---|---|---|---|
| FR | 2965950 A1 * | 4/2012 | | G01M 5/0066 |
| JP | 2012233814 A * | 11/2012 | | |
| KR | 20020028246 A * | 4/2002 | | |

OTHER PUBLICATIONS

McNeill, Implementing the Fatigue Damage Spectrum and Fatigue Damage Equivalent Vibration Testing, Presented at the 79th Shock and Vibration Symposium: Oct. 26-30, 2008 Orlando Florida (Year: 2008).*

Halfpenny, A Frequency Domain Approach for Fatigue Life Estimation from Finite Element Analysis, Key Engineering Materials ISSN: 1662-9795, vols. 167-168, pp. 401-410 © 1999 Trans Tech Publications Ltd, Switzerland (Year: 1999).*

Halfpenny, Methods for Accelerating Dynamic Durability Tests, 9th International Conference on Recent Advances in Structural Dynamics, Southampton, UK, 2006 (Year: 2006).*

Halfpenny et al, Rain Flow Cycle Counting and Acoustic Fatigue Analysis Techniques for Random Loading, 10th International Conference Jul. 1-14, 2010 Southampton RASD 2010 (Year: 2010).*

Machine Translation of Research on Test of Cooling Module Based on Frequency Acceleration Theory (Year: 2020).*

Machine Translation of Decision to Grant Chinese Patent Application No. 201680084969.9 (Year: 2020).*

Cornelis et al. "Shaker testing simulation of non-gaussian random excitations with the fatigue damage spectrum as a criterion of mission signal synthesis"—International conference on Engineering Vibration, Ljubljana, Slovenia, Sep. 7-10, 2015.

T. Achatz, J. Vanbaren, "Using Fatigue Damage Spectrum for Accelerated Testing with Correlation to End-Use Environment", ASTR 2014, http://www.asqrd.org/wp-content/uploads/2014/09/Fatigue-Damage-Spectrum-for-Accelerated-Testing.pdf (aus 2015E16554BE); 2014.

Wkipedia Fatigue_damage_spectrum (Stand Apr. 25, 2016); 2016.

Carella et al. "Using Kurtosis control with random-control vibration tests: theory and practice"—Proceedings of ISMA2014 including USD2014.

Steinwolf et al. "Two methods of generating random excitations with increased Kurtosis for in-house testing of vehicle components"—ICSV22, Florence (Italy) Jul. 12-16, 2015.

Halfpenny: "Methods for accelerating dynamic durability tests", White Paper nCode International, available online from nCode Resource Center, presented at 9th International Conference on Recent Advances in Structural Dynamics, Jul. 17-19, 2006, Southampton, UK, XP055002697, Retrieved from the Internet: URL:http://www.ncode.com/fileadmin/mediapool/nCode/downloads/VVhitepaper nCodeMethodsforAcceleratingDynamicDurabiTityTest v2-Halfpenny.pdf—[retrieved on Jul. 13, 2011] the whole document; 2010.

PCT International Search Report and Written Opinion of International Searching Authority dated Jan. 26, 2017 corresponding to PCT International Application No. PCT/EP2016/059649 filed Apr. 29, 2016.

U.S. Appl. No. 16/097,456 filed Oct. 29, 2018 for: Method and System for Accelerated Fatigue Damage Testing of an Object Examiner.

Yu, Xiaohui et al., "Research on Test of Cooling Module Based on Frequency Acceleration Theory", China Academic Journal Electronic Publishing House, Apr. 30, 2015, pp. 1-20.

* cited by examiner

METHOD AND SYSTEM FOR ACCELERATED FATIGUE DAMAGE TESTING OF AN OBJECT

CROSS-REFERENCE TO RELATED APPLICATIONS

This is a U.S. national stage of application No. PCT/EP2016/059649 filed Apr. 29, 2016.

BACKGROUND OF THE INVENTION

1. Field of the Invention

The present invention relates to the field of fatigue damage testing and, more particularly, to a method for accelerated fatigue damage testing of an object.

2. Description of the Related Art

In many engineering applications (e.g. in automotive or aerospace & defense), hardware equipment (including both mechanical and electronic subsystems and components) is exposed to dynamic loads that may induce failures due to fatigue phenomena. The hardware equipment will also be referred as "object". To validate whether the object (also called "test object" or "device-under-test"—(DUT)) will remain operational during the service life (i.e., verify whether it will not break due to fatigue failures), extensive vibration tests are conducted, i.e., "qualification tests". The purpose of these tests is to reproduce within a laboratory the loading conditions imposed by the real operating environments that are encountered by the DUT (e.g., driving on road, spaceflight launch, . . . ), such that a complete lifetime loading is applied in a fraction of the time.

To achieve this, measurements are performed in the real operating environments in a first step and, based on these measurements, forced vibration signals are calculated in a second step such that a shaker test using these signals will cause the same accumulated fatigue damage effect on the DUT as in the real-life operational conditions. The calculated forced vibration signals should hereby be optimized such that an equivalent fatigue behavior is achieved in a shorter amount of time (so-called "accelerated lifetime testing"). Finally, in a third step, the forced vibration signals have to be applied in a controlled manner to a shaker installation. The invention addresses the second and third parts of this procedure, i.e. how to calculate the forced vibration signals and apply them in a controlled manner to a shaker installation, so that a damage-equivalent "accelerated" qualification test is achieved.

Different procedures currently exist, e.g., applying standardized test profiles (in the form of Power Spectral Density (PSD) functions, shock profiles, sine sweeps, sine-on-random spectra, . . . ). These standardized test profiles typically have to cover a wide range of applications. As a consequence, the standard specifications are chosen to be conservative in order to prevent "undertesting", so that in many specific applications the test specifications are much more severe than the actual environmental loads.

Another example is replicating the time waveforms that were measured in operation. This method is typically restricted to a limited range of time intervals, continuously repeated. This is suitable for loads with repeating patterns, but less so for environmental loads that are of "stochastic random" nature as in the envisioned applications. The control method (commonly denoted as "Time Waveform Replication" or "Single-Axis Waveform Replication") is provided by most shaker control applications.

Generating a PSD test specification based on the enveloped PSD spectra of the measured real life loading signals, followed by a (Gaussian) random vibration control test is a standard feature in nearly any commercial available shaker control software. This approach allows for a more statistically representative testing of complex load environments. However, by reducing the data to a PSD, the method implicitly assumes that the environmental loads have a Gaussian amplitude probability density function (PDF) and that they are stationary. In case the real world load environment has an amplitude distribution that is non-Gaussian, e.g., because there are specific events that occur (such as potholes or bumps in the road that cause peaks in the loading and in the responses), some of the fatigue-related content of the loads can be underestimated, even when the PSD is well approximated.

An advanced method employs generating of non-Gaussian excitation signals by "kurtosis control" methods. In addition to the PSD, statistical signal parameters such as the "kurtosis" can also be specified and controlled. Kurtosis represents the "peaked-ness" of the data, mathematically expressed as the 4-th statistical moment (where K=3 is the Gaussian case and K>3 is non-Gaussian with heavier tails in the amplitude PDF compared to the Gaussian case).

The goal of these methods is to match the PSD and kurtosis of the originally measured excitation (i.e., the INPUT to the system). However, the fatigue loading effect on the object (DUT) which is dependent on how much of the kurtosis transfers into the system response, i.e., into the OUTPUT of the system, is not considered explicitly by the methods. It is well-known that without precautions, kurtosis may get "lost" in a system response due to adherence to the central limit theorem. As a result, the methods fail in many cases to correctly represent the fatigue behavior during the laboratory tests. This leads to longer testing times to reach the same fatigue phenomena and it prevents the ability to design accelerated tests.

An example for a solution for kurtosis control is the "Time-Frequency Domain Swapping" method, described in Carella et al. "Using Kurtosis control with random-control vibration tests: theory and practice"—Proceedings of ISMA2014 including USD2014.

Another example is the "Analytical phase selection" method described in Steinwolf et al. "Two methods of generating random excitations with increased Kurtosis for in-house testing of vehicle components"—ICSV22, Florence (Italy) 12-16 Jul. 2015, also described in Cornells et al. "Shaker testing simulation of non-gaussian random excitations with the fatigue damage spectrum as a criterion of mission signal synthesis"—International conference on Engineering Vibration, Ljubljana, Slovenia, 7-10 Sep. 2015.

The most advanced qualification testing methodology is referred to as "Test Tailoring" or "Mission Synthesis". The methodology first quantifies the "damaging potential" of measured operational loads by calculating the so-called "Fatigue Damage Spectrum" (FDS) function. The FDS can be calculated on any type of signal, e.g., shocks, deterministic sine waves, Gaussian or non-Gaussian random signals. Therefore, it allows the comparison of different signals and signal types in terms of fatigue damaging potential. In the subsequent test synthesis stage, a test duration is selected and a PSD test specification is derived such that the generated (Gaussian) excitation signals, which are applied to the shaker installation using a default Gaussian random vibration control method, match the FDS of the operational loads (hence the laboratory test should cause equivalent fatigue damage as the operational environment).

A problem with the Mission Synthesis method particularly occurs when "accelerated" tests are required, i.e., where the test duration has to be reduced. The only way to achieve this currently is through upscaling the PSD levels, i.e., it is the only way to still match the same FDS in a smaller amount of testing time, given Gaussian excitation signals. There are multiple risks when upscaling the PSD levels, but most important is the fact that the failure mode may change when the levels are too high, i.e., causing the object or DUT to fail by a different mechanism than the intended high-cycle fatigue phenomenon which occurred in real-life. For this and various other reasons, all standards suggest that the "test exaggeration factor" (i.e., the ratio of test PSD level over operational PSD level) should be kept to a minimum if possible. In a recent presentation by Vibration Research (Achatz et al. "Using fatigue damage spectrum for accelerated testing with correlation to end-use environment"—2014 Workshop on Accelerated Stress Testing and Reliability, September 10-12, St. Paul, Minn., U.S.A.), it was demonstrated that mission synthesis based on FDS can be combined with a method for controlling kurtosis, hence generating non-Gaussian signals with peaks. The method matches the kurtosis of the measured operational loads (as in regular kurtosis control methods), and at the same time tries to match the FDS (in contrast to regular kurtosis control methods). The method first calculates a "shaped" PSD specification from the FDS (in an offline manner), also taking into account that activation of a method for controlling kurtosis will add some additional damage. When an accelerated test is demanded, the method increases the PSD levels, similar as in other approaches. Thus, the resulting PSD still has higher levels compared to the operational signals, such that the problems discussed above are still unresolved.

SUMMARY OF THE INVENTION

In view of the foregoing, it is therefore an object of the present invention to provide an improved method for accelerated vibration testing.

This and other objects and advantages are achieved in accordance with the invention by a method for accelerated fatigue damage testing of an object, where the object is excited via an actor, where a drive signal, i.e., an electric voltage, is generated by a control system and transmitted to the actor, whereby the acceleration of the object or of a mounting base of the actor is measured and fed back to the control system for a cycled closed loop control of the drive signal in the frequency domain, where within the control system, a Power Spectral Density PSD and a Fatigue Damage Spectrum FDS are calculated from the measured acceleration, whereby the calculated Power Spectral Density PSD is compared with a target Power Spectral Density PSD based on an operational load, whereby the calculated Fatigue Damage Spectrum FDS is compared with a target Fatigue Damage Spectrum FDS, whereby a new drive frequency spectrum is calculated based on the comparisons, and one or multiple time-domain blocks for the drive signal for a next cycle are generated from the new drive frequency spectrum and transmitted to the actor. This method accelerates vibration testing without affecting the failure mode, thus coming to more realistic results.

It is also an object of the invention to provide a system for accelerated fatigue damage testing of an object having an actor to excite the object a control system in which a drive signal is generated and transmitted to the actor, a sensor with which the acceleration of the object or of a mounting base of the actor is measured, where the measured acceleration is fed back to the control system for a cycled closed loop control of the drive signal in the frequency domain, where, a Power Spectral Density PSD and a Fatigue Damage Spectrum FDS are calculated in the control system from the measured acceleration, the calculated Power Spectral Density PSD is compared with a target Power Spectral Density PSD based on an operational load, the calculated Fatigue Damage Spectrum FDS is compared with a target Fatigue Damage Spectrum FDS, whereby, based on the comparisons, a new drive frequency spectrum is calculated and, from the new drive frequency spectrum, one or multiple time-domain blocks for the drive signal for a next cycle are generated and transmitted to the actor. With such system the advantages as described for the method can be achieved.

In an embodiment, for calculating the new drive frequency spectrum the recent drive frequency spectrum is adapted, where the amplitudes of the frequency lines in the drive frequency spectrum are adapted in accordance with the comparison of the Power Spectral Density PSD, and the phases of the drive frequency spectrum are adapted in accordance with the comparison of the Fatigue Damage Spectrum FDS. The phases of the drive frequency spectrum have an influence on the amplitude PDF of the generated time signal (hence the link between phases and kurtosis). Accordingly, a two channel closed loop control is established so that impacts from one channel to the other (and vice versa) can be eliminated. The kurtosis of the generated time signal can be adapted by manipulating the phase at one or several particular frequency lines of the drive frequency spectrum. In an advantageous embodiment, the phases are manipulated such that the method becomes independent from single unknown resonance frequencies of the object.

In the control system, it is helpful if the Power Spectral Density PSD and the Fatigue Damage Spectrum FDS of the vibration signal are controlled completely independent from each other. This makes it, inter alia, possible to adapt the control cycles to the specific needs of every "channel" and to available computing power.

The target Power Spectral Density PSD and the target Fatigue Damage Spectrum FDS should be regarded as pre-defined "a priori" constants. Accordingly, a re-calculation during runtime is not necessary. The target Power Spectral Density PSD can be chosen according to the vibration load of operational condition for the object, and the target Fatigue Damage Spectrum FDS can be chosen according to the total damage to the object for a lifetime mission of the object (as determined by operational measurements in the first step of the standard "Test Tailoring" or "Mission Synthesis" methodology). For example, for an aircraft landing gear the FDS can sum up the permissible damaging loads for some thousand start-landing-cycles which are expected for the lifetime of a plane. Accordingly, the FDS is a constant that is pre-defined by the assumed start-landing-cycles and by the forces etc. occurring at the landings. An accelerated testing procedure should apply the same "damage", but in a shorter amount of time or less cycles than in real life.

After the calculations, one or multiple time-domain blocks for the drive signal for a next cycle are generated with an Inverse Fast Fourier Transformation. These time blocks shall be used until the next control cycle is completed.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE EXEMPLARY EMBODIMENTS

Figure 1:
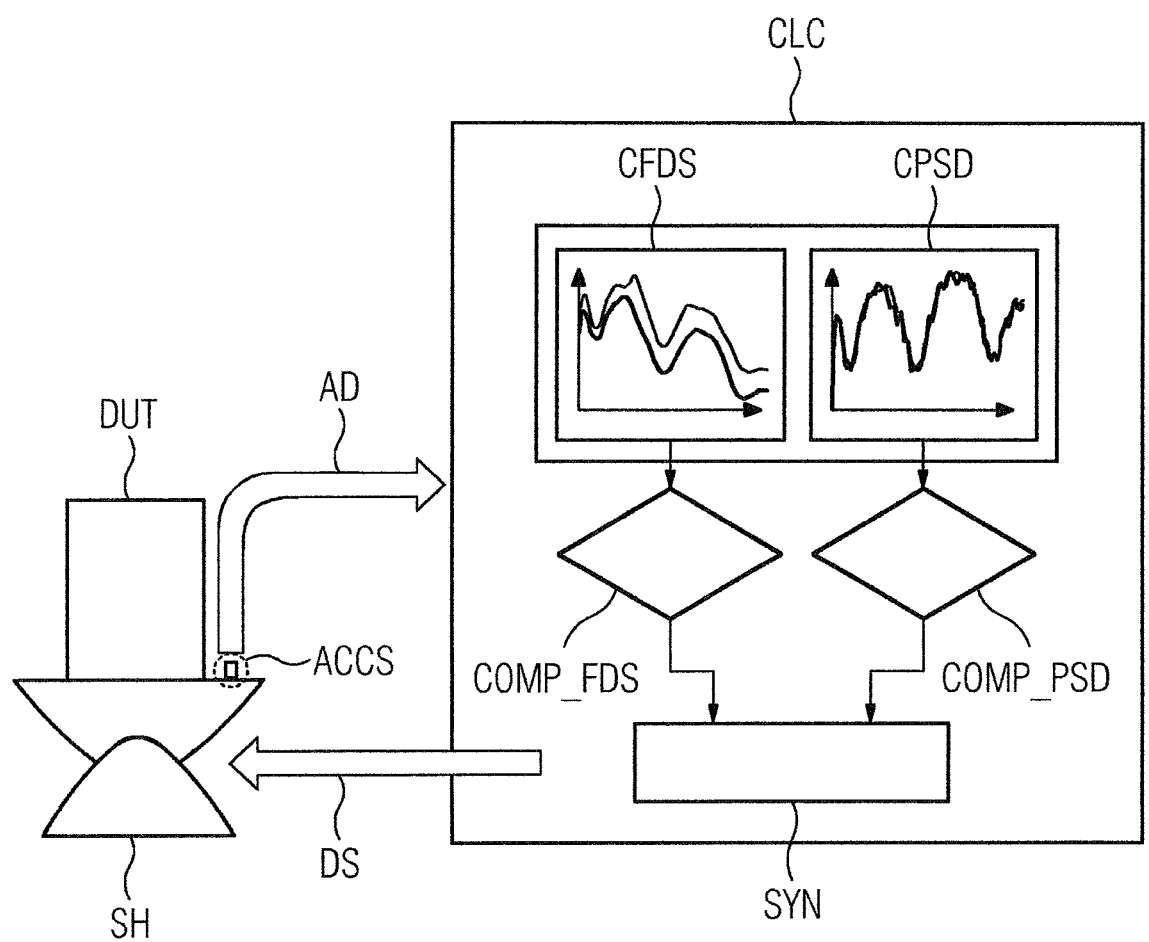
FIG. 1 is a schematic overview of the system in accordance with the invention.

The left side of FIG. 1, which entails an actor SH (here: the shaker hardware) and sensors, is the same as in common vibration control systems. The system features as sensor ACCS, a "control accelerometer", e.g., instrumented on a mounting base (in the figure: the shaker table SH) or the object DUT itself. The signal AD (acceleration data) of this control accelerometer ACCS will be checked by the closed-loop FDS+PSD control system CLC, in order to ensure that the forced vibration signals (representing the vibration environment) are correctly simulated by the actor SH. Based on the control acceleration feedback AD (acceleration data) of a previous iteration or previous or last control cycle, the closed-loop control system CLC will calculate a new "drive signal" DS (an electric voltage, also called drive time signal) (e.g., by tuning amplitudes and phases of one or more spectrum lines) which is sent to the actor SH (shaker table, shaker system) amplifier input. Optionally, other sensors can also be instrumented on the object DUT (device under test). These additional sensors are merely used for monitoring purposes (e.g., to assess whether the vibration levels on critical points on the DUT are not too high), but are not necessarily further utilized by the control system.

The right side of FIG. 1 illustrates the two-channel closed-loop control system CLC, which is the core of the system. Basically, this controller CLC can be conventional computer hardware with I/O interfaces and multiple software modules. Some or all calculations might be done by a DSP (DSP—digital signal processor) for reducing calculation time and thus achieving shorter control cycles.

In contrast to common control systems, the objective of the method is to control both a specified FDS and PSD at the same time ("FDS+PSD control"). By targeting the FDS as direct control criterion, the method can achieve damage equivalence compared to the operational load environments (assuming a lifetime FDS specification has been determined from operational data, e.g., through the standard "Mission Synthesis" methodology).

Having determined an FDS for lifetime damage for the object and having information for the original (not accelerated) load duration, a PSD can be calculated that causes, in a non-accelerated test situation, an equivalent damage as the original load over the original time.

As will be further explained below, an accelerated damage-equivalent qualification test (where the same damage has to be applied in a reduced time) can furthermore be achieved by manipulating the kurtosis of the generated forced vibration signals (i.e., making the signals more non-Gaussian, introducing more "peaked-ness"), while the PSD of the signal is kept at the same level as the operational loads and the total FDS over the complete test procedure is maintained.

In more detail, the closed-loop "FDS+PSD" control system CLC in each iteration first analyses the control accelerometer signal AD; the FDS and PSD are calculated e.g. by software or DSP-modules CFDS, CPSD (calculate FDS, calculate PSD). Next, the calculated FDS and PSD functions are compared to the "Target FDS" and "Target PSD" functions, e.g., by software modules COMP-FDS, COMP_PSD (compare FDS, compare PSD). When the PSD target is either not reached or exceeded at a particular frequency line, an update rule can be applied that determines the amplitude that should be used for this frequency line when generating the next iteration drive signal DS. When the FDS target is either not reached or exceeded (at a particular frequency line), the damaging potential of the excitation has to be increased or decreased, respectively. The procedure should change the damage potential without affecting the PSD level, because this is controlled independently. Therefore, the procedure will instead alter the kurtosis of the excitation (i.e., increasing the kurtosis if more damage is required, or else decreasing the kurtosis if the damage is too high).

Based on the comparison of PSD and FDS, a new drive frequency spectrum is created, e.g., in a module SYN for signal synthesis. Therein, the FDS and the PSD of the measured vibration signal should be approached to the a priori defined target values. Various control strategies can be used, including conventional PID control. As previously discussed, the amplitudes are determined by an update rule (based on the PSD comparison). In regular random control, the amplitudes are complemented by independent and uniformly-distributed random phases, resulting in a Gaussian signal. In this case, a higher kurtosis (K>3) is however likely required (as dictated by the FDS comparison). This is achieved by a special phase manipulation strategy, i.e., where dependencies between the phases are created.

Finally, once the drive frequency spectrum has been tuned, one or multiple time-domain blocks are generated, e.g., by applying an Inverse Fast Fourier Transform (IFFT), and adding windowing and overlapping (as in standard IFFT-based random controllers). This can be done in the module SYN, as described before.

Accordingly, the FDS calculation is an integral part of the control loop, i.e., computed in each iteration or in each control cycle. The method synthesizes time domain signals based on IFFT. However, as the phases are not all chosen as independent uniform-distributed random variables, the resulting signal is non-Gaussian with kurtosis >3. This manner of kurtosis generation for the purpose of FDS control is distinct from other approaches, where an a-priori determined target kurtosis has to be achieved.

The method should manipulate the kurtosis only in order to match the specified target FDS (including "test acceleration"), while the PSD should be controlled separately in order to match a specified target PSD shape. The method thus utilizes a particular "kurtosis generation" method as important subroutine. Therein, it is possible to control the kurtosis and PSD separately, whereby a change in one property does not affect the other property. This is, e.g., a problem with common methods such as the polynomial transform method.

It is known that the response of a lightly-damped linear system is closer to Gaussian than the applied excitation. Therefore, in order to increase the response kurtosis in an accelerated test, the kurtosis control method must be able to effectively generate kurtosis that passes into the resonances.

The FDS introduces the concept of damage at particular frequency lines. Therefore, the kurtosis generation method is able to directly target a particular frequency line. This is not possible with time-domain kurtosis methods such as the time-frequency domain swapping method.

The main advantages are the fact that the FDS is used as control criterion that is very important for qualification testing where damage-equivalence to operational environments is the main objective and, moreover, that "accelerated testing" (i.e., reducing the testing time by inducing more damage in a shorter amount of time) is achieved without affecting the PSD level, but rather by generating higher kurtosis excitation signals. The latter advantage greatly reduces the risk that the object or DUT fails due to a different failure mode than the targeted fatigue phenomena. This solves the main problem with the current Mission Synthesis approaches, which increase the PSD levels in an accelerated test.

To achieve this, FDS calculations, which are an integral part of the control loop, and a specialized kurtosis generation methodology based on a "Analytical Phase Selection" method are combined synergistically in a closed-loop controller, i.e., the "FDS+PSD control" system illustrated in FIG. 1.

Figure 2:
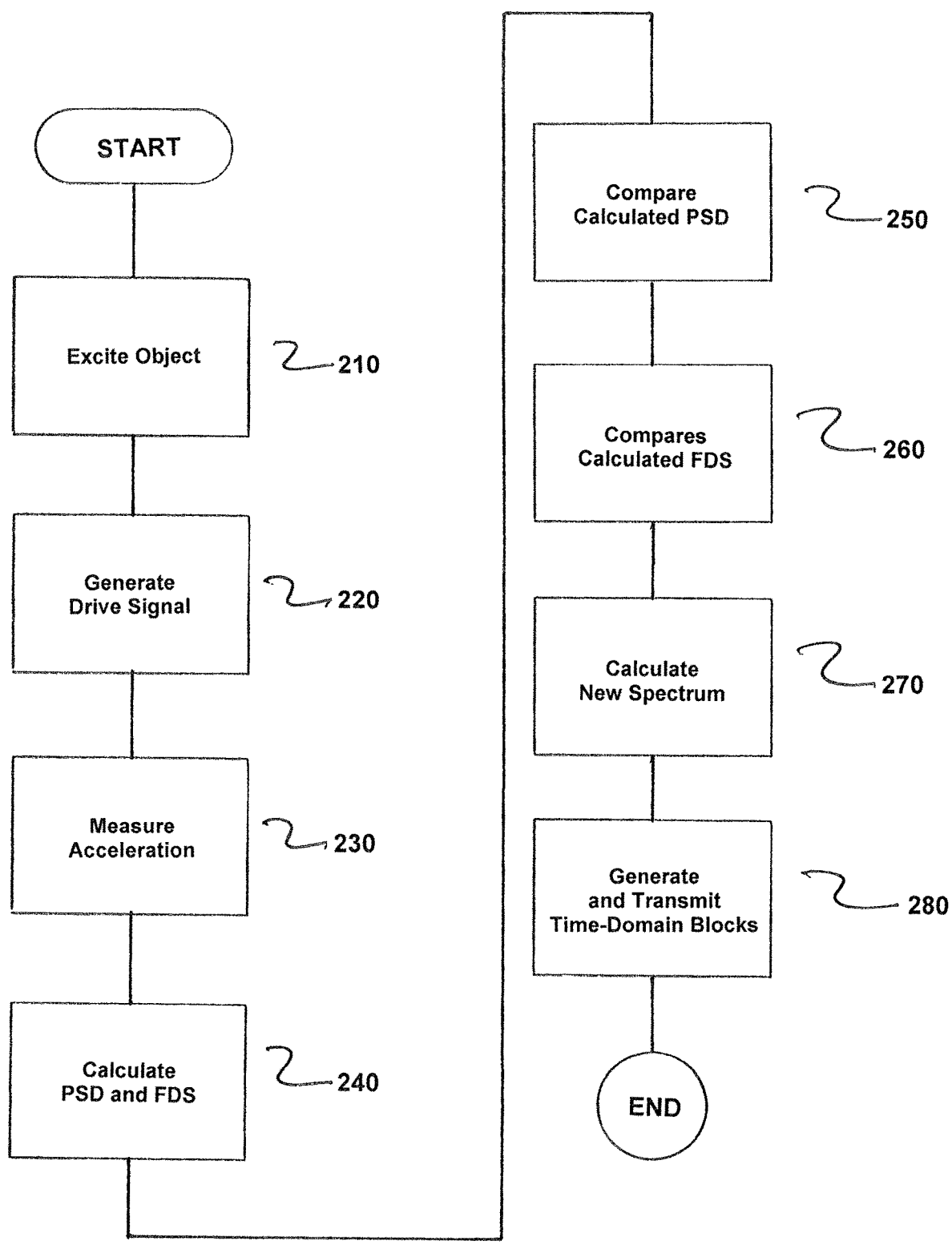
FIG. 2 is a flowchart of the method in accordance with the invention.

FIG. 2 is a method for accelerated fatigue damage testing of an object DUT. The method comprises exciting the object DUT via an actor SH for a prescribed period of time, as indicated in step 210.

Next, a drive signal DS is generated by a control system CLC and transmitted to the actor SH, as indicated in step 220.

Next, an acceleration of at least one of (i) the object (DUT) and (ii) a mounting base of the actor (SH) is measure and fed back to the control system (CLC) for a cycled closed loop control of the drive signal (DS) in the frequency domain, as indicated in step 230.

In multiple cycles during the test, the method includes calculating a Power Spectral Density PSD and a Fatigue Damage Spectrum FDS from the measured acceleration AD within the control system CLC (step 240), comparing the calculated PSD with a predefined target PSD (step 250), comparing the calculated FDS with the predefined target FDS (step 260), calculating a new drive frequency spectrum based on comparisons such that targets for PSD and FDS are approached (step 270) and generating and transmitting at least one multiple time domain blocks for the drive signal DS for a next cycle from the new drive frequency spectrum to the actor (step 280).

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for accelerated fatigue damage testing of an object, the method comprising:
   exciting the object via an actor for a prescribed period of time;
   generating a drive signal by a control system and transmitting the generated drive signal to the actor; and
   measuring an acceleration of at least one of (i) the object and (ii) a mounting base of the actor and feeding the measured acceleration back to the control system for a cycled closed loop control of the drive signal in the frequency domain, the method further comprising in multiple cycles during the test:
   calculating a Power Spectral Density (PSD) and a Fatigue Damage Spectrum (FDS) from the measured acceleration within the control system;
   comparing the calculated PSD with a predefined target PSD;
   comparing the calculated FDS with a predefined target FDS;
   calculating a new drive frequency spectrum based on the comparisons such that the targets for PSD and FDS are approached; and
   generating and transmitting at least one multiple time-domain blocks for the drive signal for a next cycle from the new drive frequency spectrum to the actor.

2. The method of claim 1, wherein the previous drive frequency spectrum is adapted to calculate the new drive frequency spectrum;
   wherein amplitudes of frequency lines in the new drive frequency spectrum are adapted in accordance with the comparison of the PSD; and
   wherein phases of the new drive frequency spectrum are adapted in accordance with the comparison of the FDS.

3. The method of claim 2, wherein a kurtosis of the generated drive signal is adapted by manipulating the phase along at least one particular frequency line of the new drive frequency spectrum.

4. The method of claim 1, wherein the predefined target PSD is based on an operational load.

5. The method of claim 1, wherein the predefined target FDS is based on a pre-determined lifetime mission.

6. The method of claim 1, wherein the PSD and the FDS of the measured acceleration are controlled within the control system independently from each other.

7. The method of claim 1, wherein the target PSD and the target FDS are pre-defined constants.

8. The method of claim 1, wherein the target PSD is chosen in accordance with a vibrational load of an operational condition for the object.

9. The method of claim 1, wherein the target FDS is chosen in accordance with total determined damage to the object for a lifetime of the object.

10. The method of claim 1, wherein the at least one multiple time-domain blocks for the drive signal for a next cycle are generated with an Inverse Fast Fourier Transformation.

11. A system for accelerated fatigue damage testing of an object, comprising:
    an actor which excites the object;
    a control system which generates and transmits a drive signal to the actor;
    a sensor, acceleration of at least one of (i) the object and (ii) a mounting base of the actor being measured by the sensor and being fed back to the control system for a cycled closed loop control of the drive signal in the frequency domain;

wherein for multiple cycles a Power Spectral Density (PSD) and a Fatigue Damage Spectrum (FDS) are calculated within the control system from the measured acceleration;

wherein the calculated PSD is compared with a target PSD in each cycle;

wherein the calculated FDS is compared with a target FDS;

wherein a new drive frequency spectrum is calculated based on comparisons; and wherein at least one multiple time-domain block for the drive signal for a next cycle is generated from the new drive frequency spectrum and transmitted to the actor.

12. The system as claimed in claim 11, wherein the control system is configured to adapt the previous drive frequency spectrum to calculate the new drive frequency spectrum;

wherein amplitudes of frequency lines in the new drive frequency spectrum are adapted in accordance with the comparison of the PSD; and wherein phases of the new drive frequency spectrum are adapted in accordance with the comparison of the FDS.

13. The system of claim 11, wherein the control system is configured to adapt a kurtosis of the generated drive signal by manipulating the phases along at least one particular frequency line of the new drive frequency spectrum.

14. The system of claim 12, wherein the control system is configured to adapt a kurtosis of the generated drive signal by manipulating the phases along at least one particular frequency line of the new drive frequency spectrum.

15. The system of claim 11, wherein the control system is configured to control the PSD and the FDS of the measured acceleration independently from each other.

* * * * *